(12) United States Patent
Myung et al.

(10) Patent No.: US 10,050,261 B2
(45) Date of Patent: Aug. 14, 2018

(54) CATHODE MATERIAL FOR LITHIUM SECONDARY BATTERY, AND LITHIUM SECONDARY BATTERY CONTAINING SAME

(71) Applicant: INDUSTRY-ACADEMIA COOPERATION GROUP OF SEJONG UNIVERSITY, Seoul (KR)

(72) Inventors: Seungtaek Myung, Seoul (KR); Changheum Jo, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 14/910,954

(22) PCT Filed: Aug. 8, 2014

(86) PCT No.: PCT/KR2014/007397
§ 371 (c)(1),
(2) Date: Feb. 8, 2016

(87) PCT Pub. No.: WO2015/020486
PCT Pub. Date: Feb. 12, 2015

(65) Prior Publication Data
US 2016/0197346 A1    Jul. 7, 2016

(30) Foreign Application Priority Data

Aug. 8, 2013 (KR) .......... 10-2013-0094428
Aug. 8, 2014 (KR) .......... 10-2014-0102252

(51) Int. Cl.
H01M 4/131    (2010.01)
H01M 4/136    (2010.01)
(Continued)

(52) U.S. Cl.
CPC ......... H01M 4/136 (2013.01); H01M 4/0404 (2013.01); H01M 4/131 (2013.01);
(Continued)

(58) Field of Classification Search
CPC ............. H01M 4/136; H01M 10/0568; H01M 4/0404; H01M 4/625; H01M 10/0525;
(Continued)

(56) References Cited

U.S. PATENT DOCUMENTS

2007/0082265 A1*  4/2007  Itou ................. H01M 4/131
                                                                429/223
2007/0259271 A1   11/2007  Nanno et al.
(Continued)

FOREIGN PATENT DOCUMENTS

JP    2003-059492 A    2/2003
JP      3736045 B2     1/2006
(Continued)

OTHER PUBLICATIONS

Synthesis and electrochimical characteristics of layered LiNi0.6Co0.2Mn0.2O2 cathode material for lithium ion batteries, Solid State Ionics 176 (2005) 1207-1211.*
(Continued)

*Primary Examiner* — Cynthia K Walls
(74) *Attorney, Agent, or Firm* — Knobbe Martens Olson & Bear LLP

(57) ABSTRACT

Provided are a cathode material for a lithium secondary battery, and a lithium secondary battery containing the same. The cathode material for a lithium secondary battery comprises: a cathode active material, which is a lithium-transition metal oxide, and a lithium phosphate layer coated on a surface of the cathode active material.

17 Claims, 11 Drawing Sheets

(51) Int. Cl.
| | |
|---|---|
| *H01M 4/36* | (2006.01) |
| *H01M 4/505* | (2010.01) |
| *H01M 4/525* | (2010.01) |
| *H01M 4/58* | (2010.01) |
| *H01M 4/62* | (2006.01) |
| *H01M 10/052* | (2010.01) |
| *H01M 4/485* | (2010.01) |
| *H01M 4/04* | (2006.01) |
| *H01M 4/133* | (2010.01) |
| *H01M 4/1397* | (2010.01) |
| *H01M 4/587* | (2010.01) |
| *H01M 10/0525* | (2010.01) |
| *H01M 10/0568* | (2010.01) |
| *H01M 10/0569* | (2010.01) |
| *H01M 10/0585* | (2010.01) |
| *H01M 4/02* | (2006.01) |

(52) U.S. Cl.
CPC ......... *H01M 4/133* (2013.01); *H01M 4/1397* (2013.01); *H01M 4/366* (2013.01); *H01M 4/485* (2013.01); *H01M 4/505* (2013.01); *H01M 4/525* (2013.01); *H01M 4/587* (2013.01); *H01M 4/5825* (2013.01); *H01M 4/621* (2013.01); *H01M 4/623* (2013.01); *H01M 4/624* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 10/0585* (2013.01); *H01M 2004/028* (2013.01); *H01M 2300/0037* (2013.01); *Y02T 10/7011* (2013.01)

(58) Field of Classification Search
CPC ............. H01M 4/587; H01M 10/0585; H01M 4/1397; H01M 4/133; H01M 10/0569; H01M 4/623; H01M 4/485; H01M 4/131; H01M 4/505; H01M 4/62
See application file for complete search history.

(56) References Cited

U.S. PATENT DOCUMENTS

2011/0086274 A1   4/2011   Chang et al.
2013/0108920 A1   5/2013   Oladeji

FOREIGN PATENT DOCUMENTS

| KR | 10-2006-0119382 A | 11/2006 |
| KR | 10-0805005 B1 | 2/2008 |
| WO | 2013089426 A1 | 6/2013 |

OTHER PUBLICATIONS

International Search Report dated Nov. 18, 2014 of PCT/KR2014/007397 which is the parent application and its English translation—4 pages.

Song et al., "Enhanced electrochemical properties of Li(Ni0.4Co0.3Mn0.3)O2 cathode by surface modification using Li3PO4-based materials", Journal of Power Sources, vol. 196—9 pages, (Sep. 22, 2010).

\* cited by examiner

[FIG. 1]
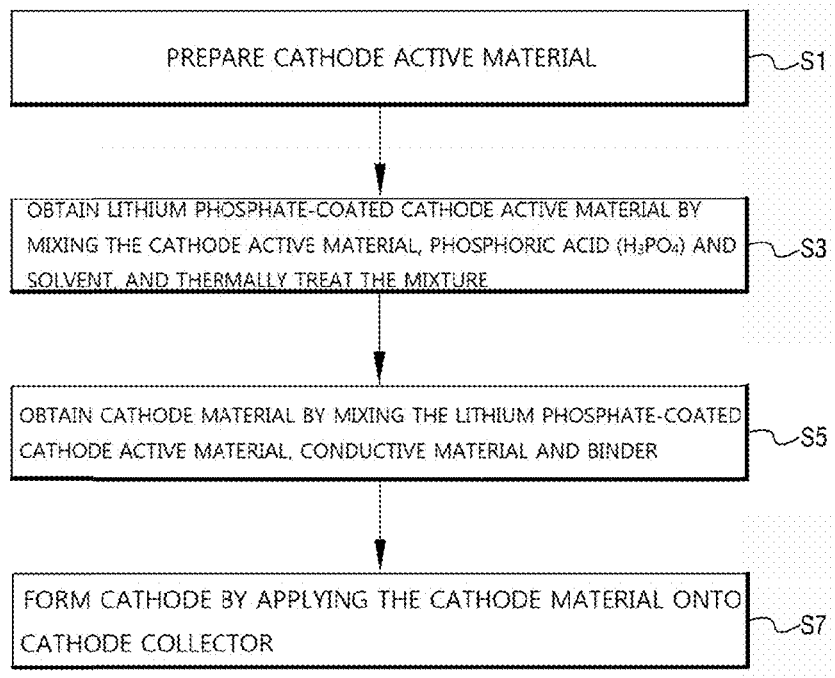
[FIG. 2]
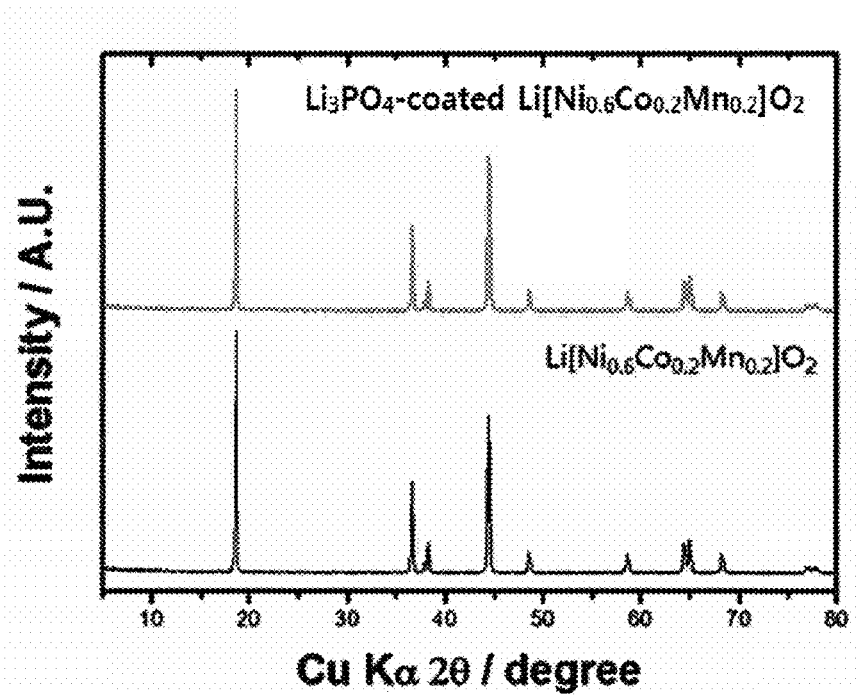

[FIG. 3]
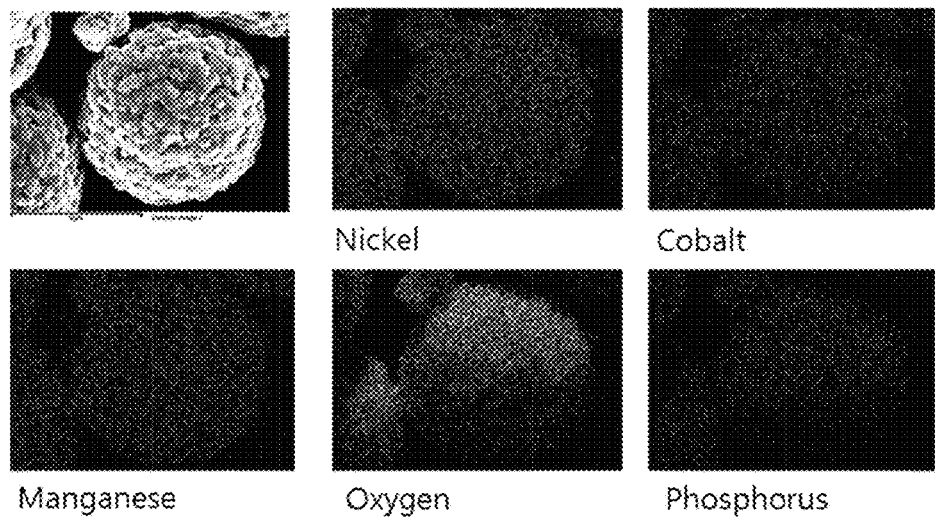

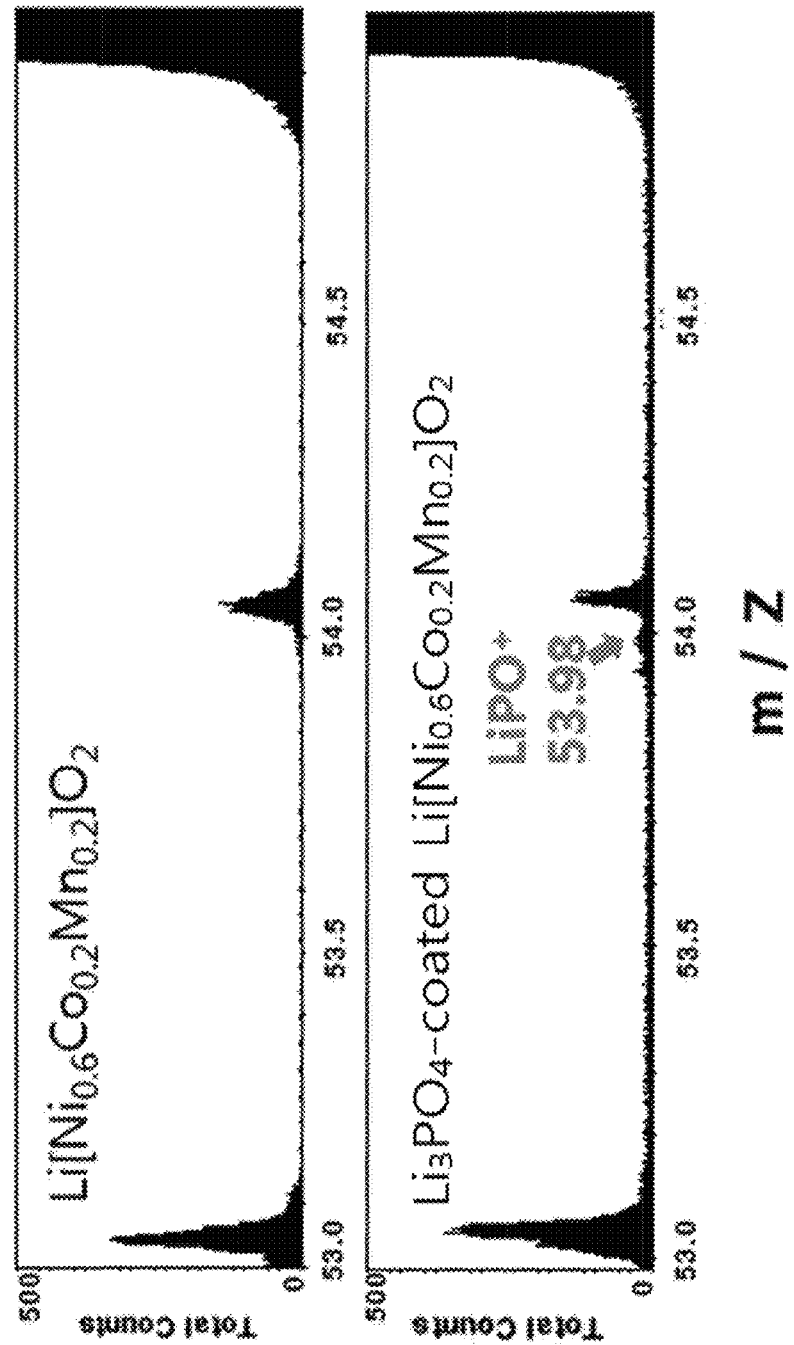

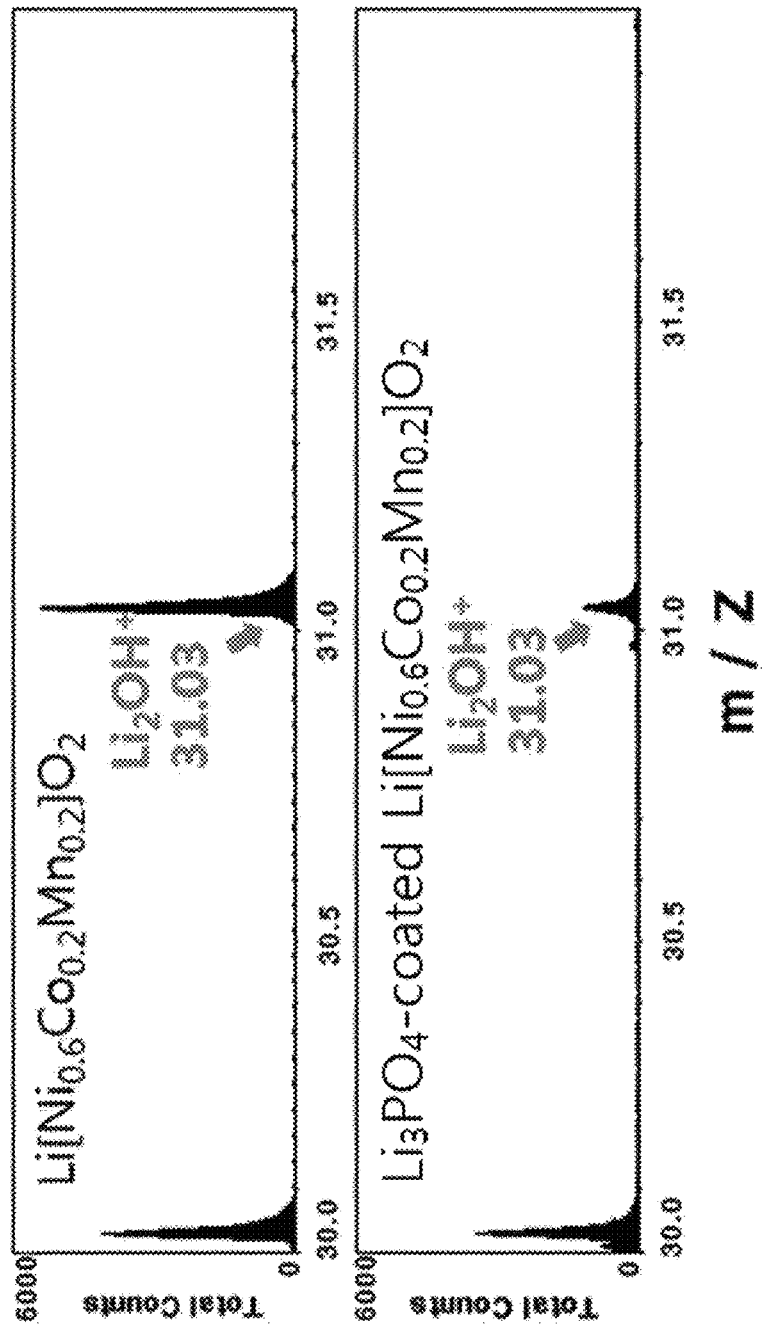
[FIG. 5]

[FIG. 6]
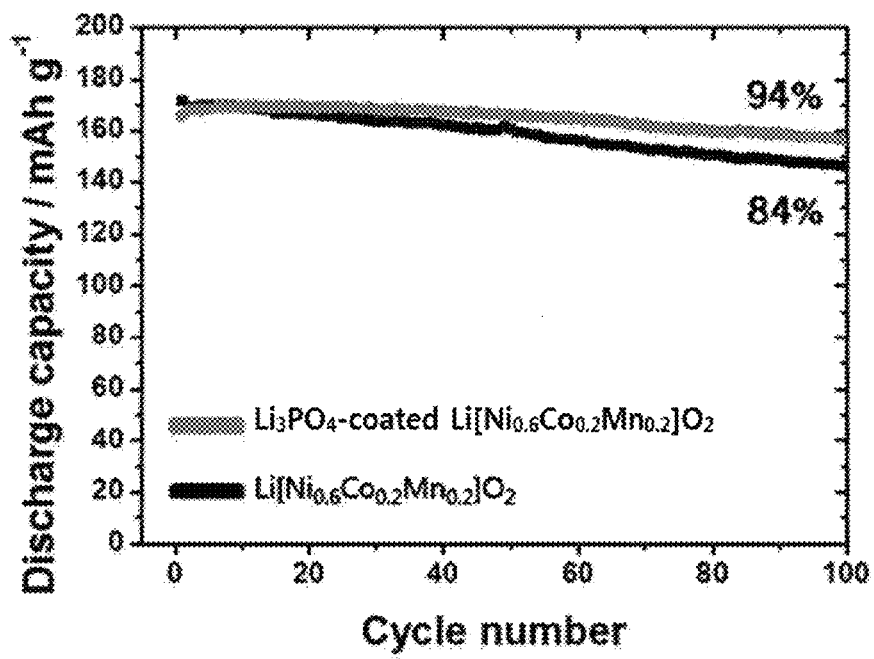
[FIG. 7]
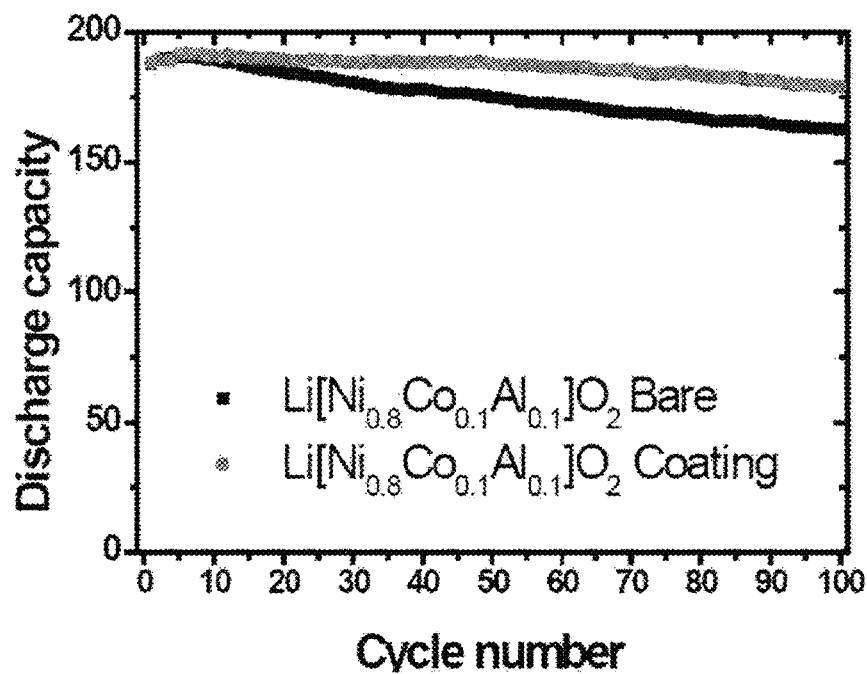

[FIG. 8]
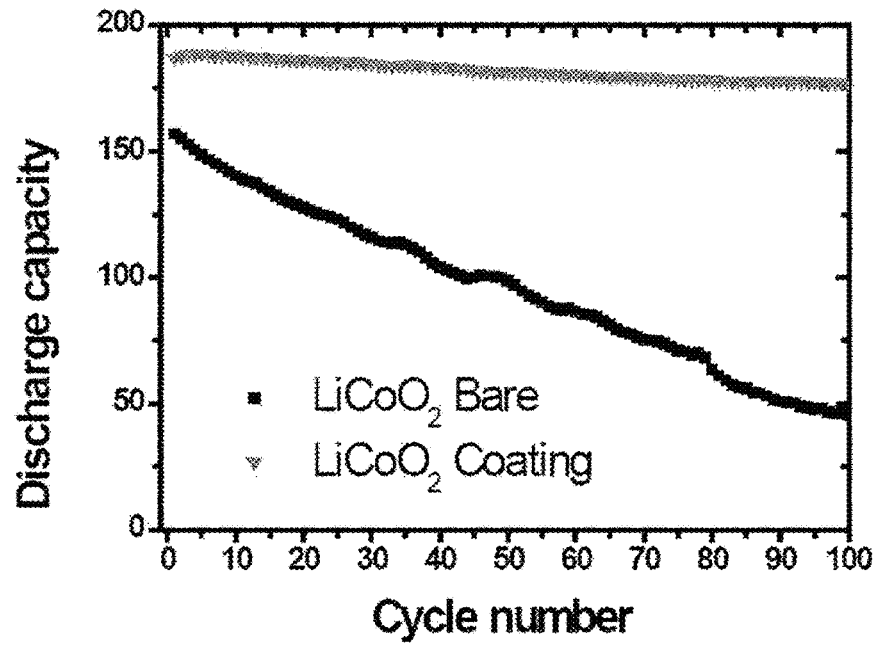
[FIG. 9]
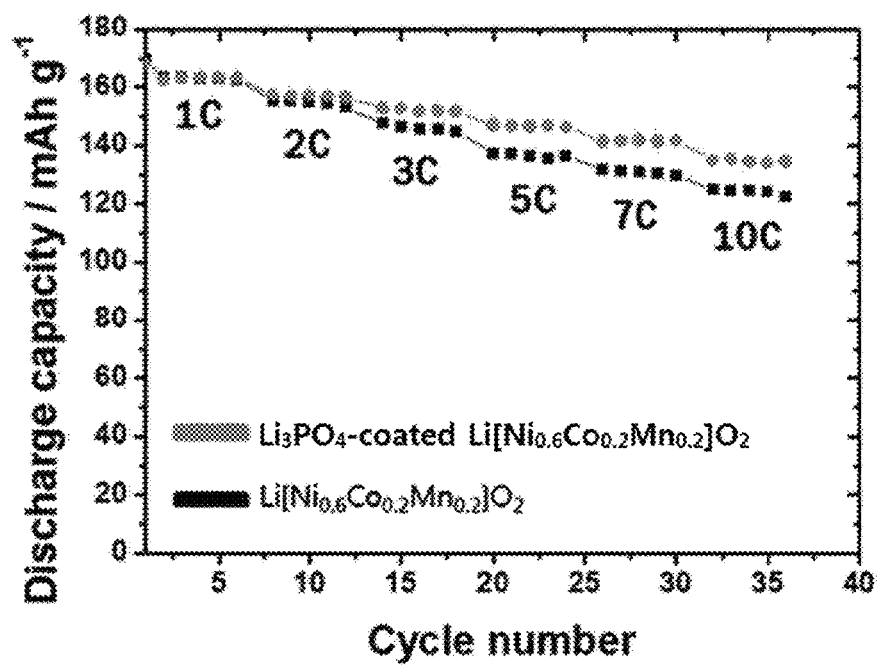

[FIG. 10a]
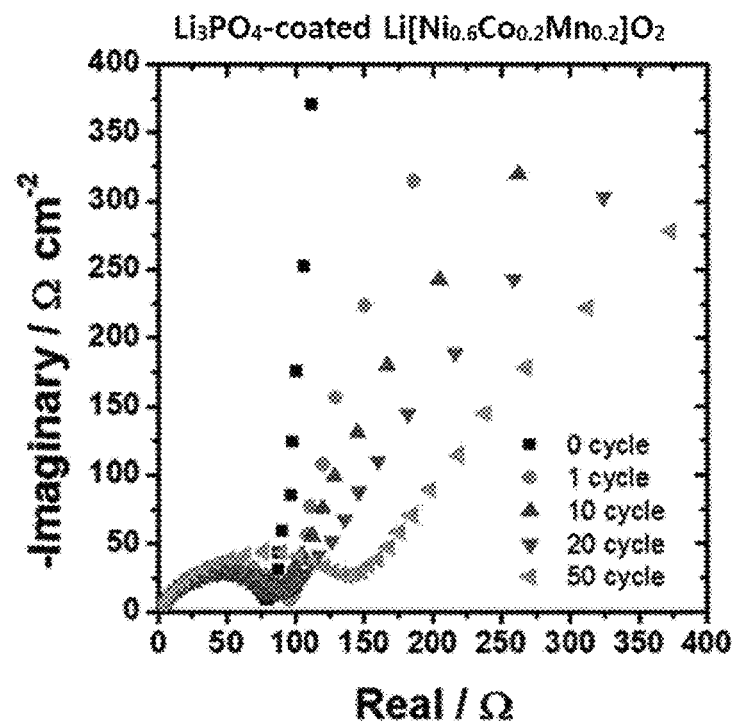
[FIG. 10b]
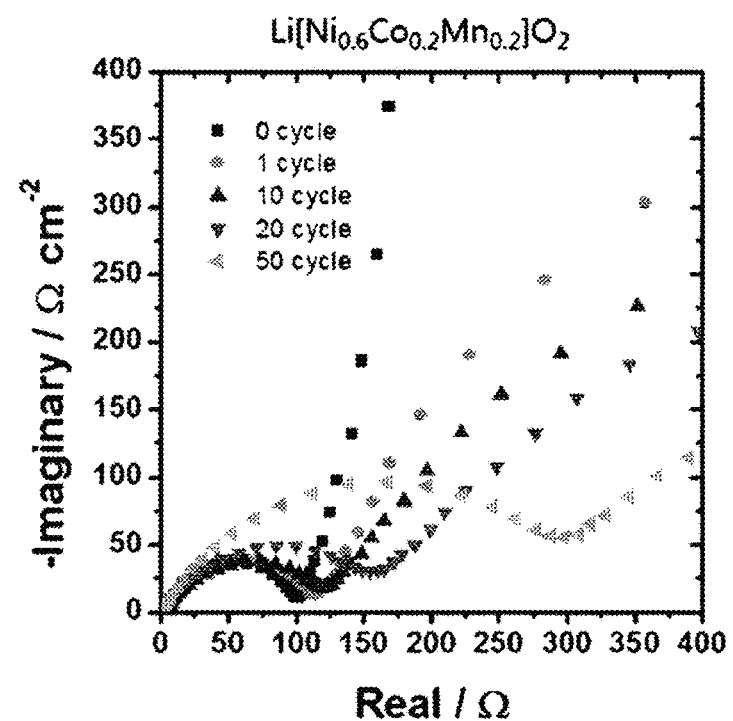

[FIG. 11a]
$Li_3PO_4$-coated $Li[Ni_{0.6}Co_{0.2}Mn_{0.2}]O_2$
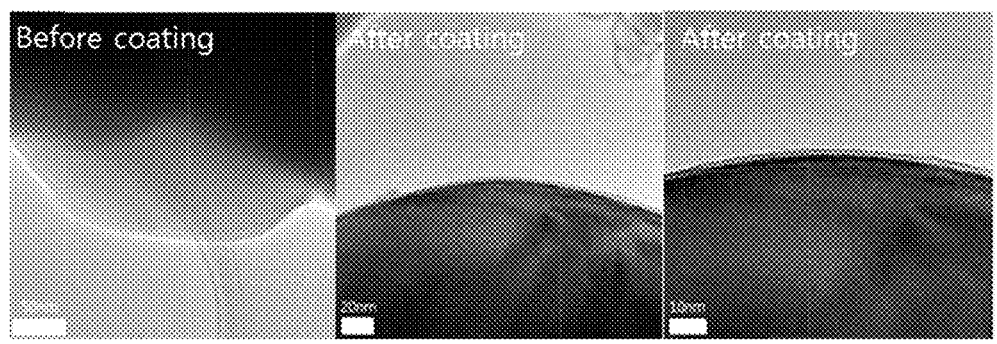
[FIG. 11b]
$Li[Ni_{0.6}Co_{0.2}Mn_{0.2}]O_2$
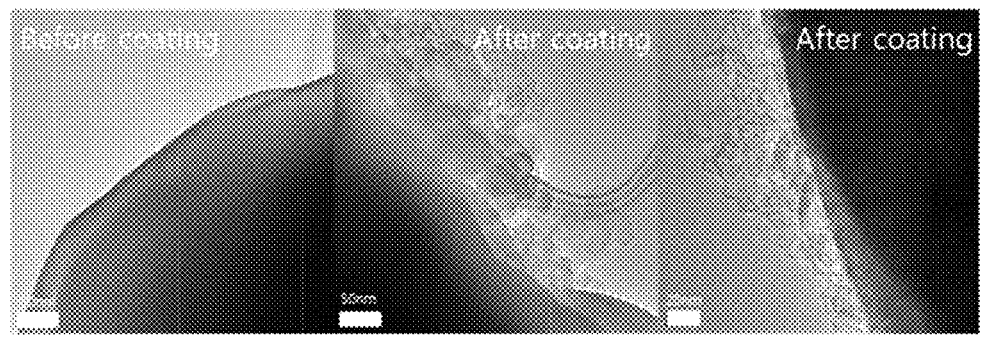

[FIG. 12]
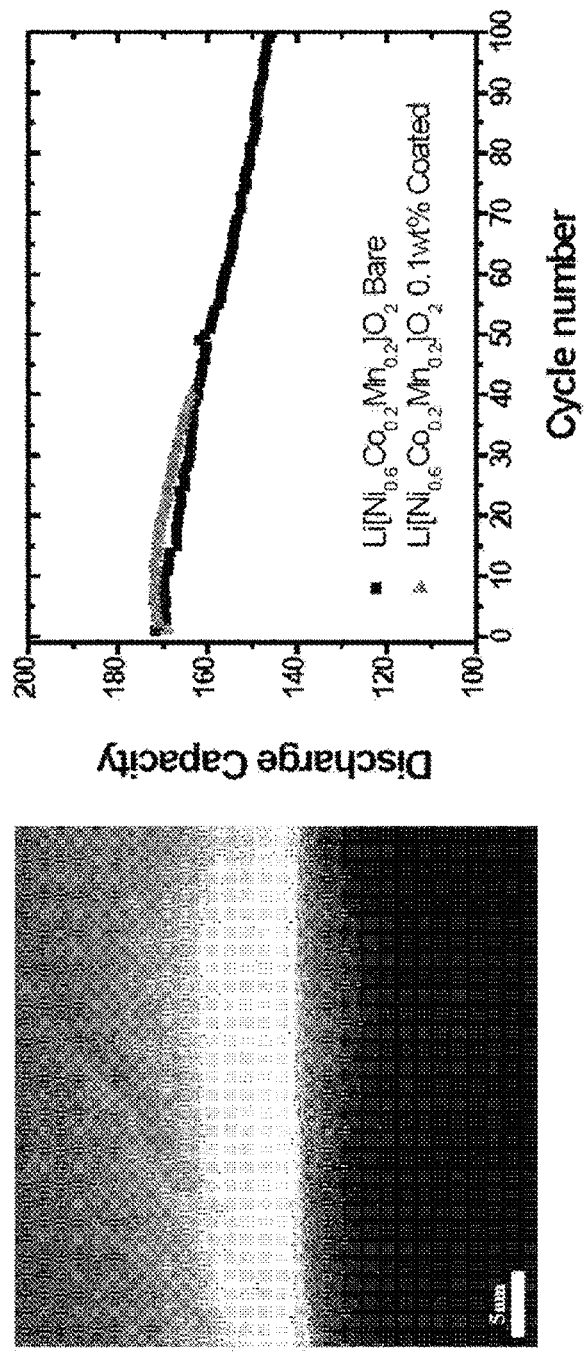

[FIG. 13]
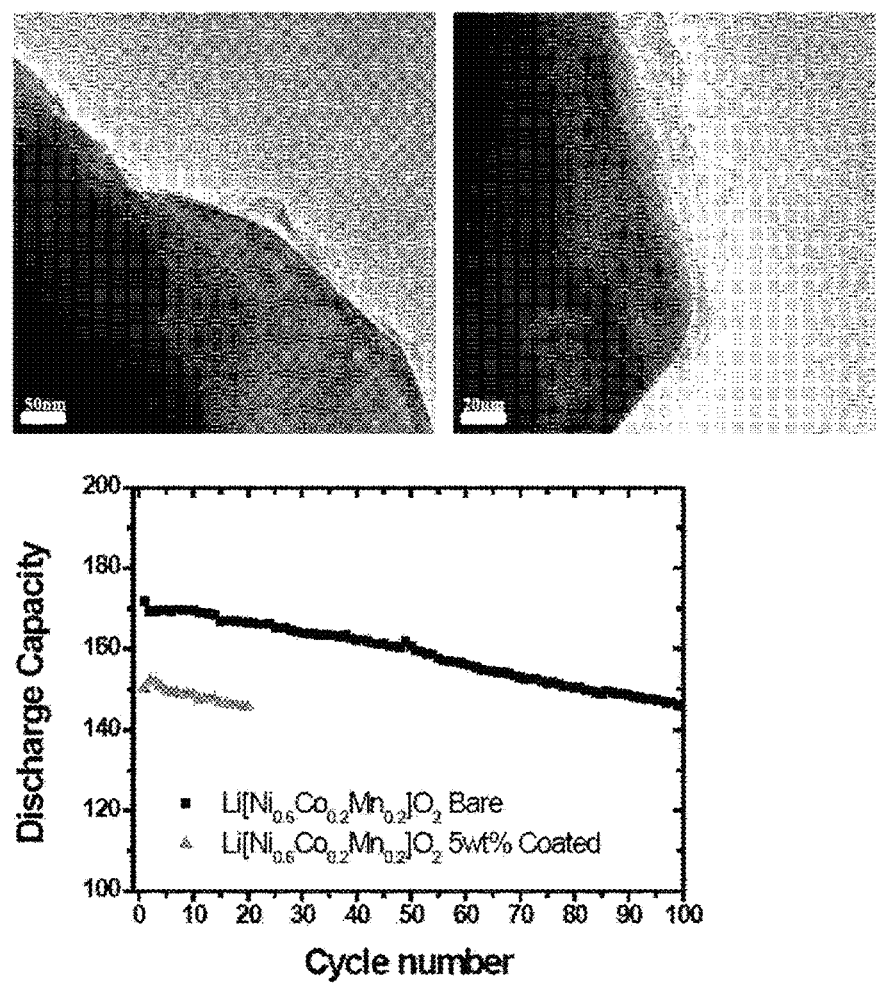

[FIG. 14]
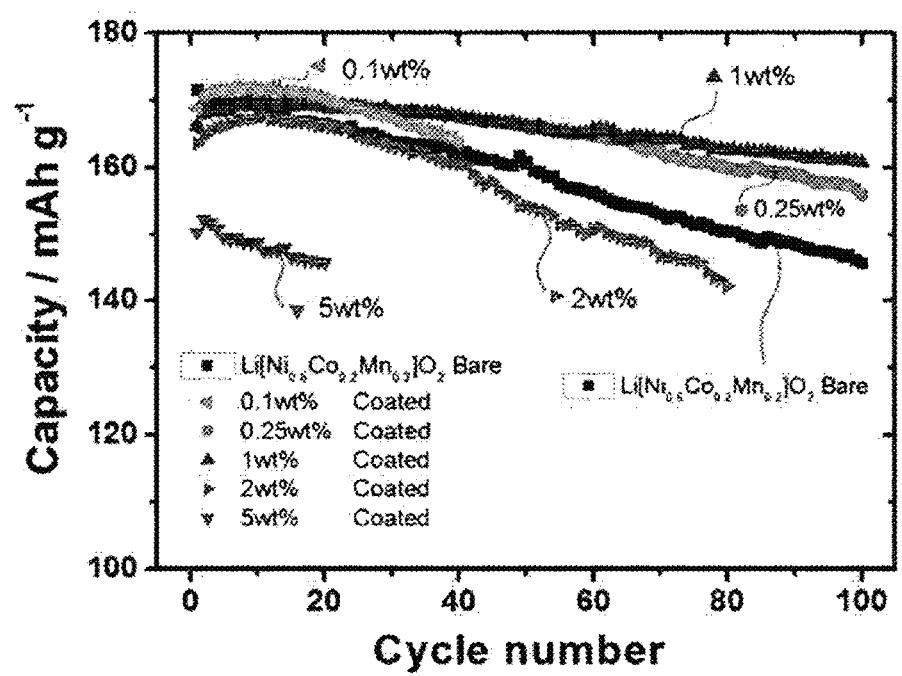

CATHODE MATERIAL FOR LITHIUM SECONDARY BATTERY, AND LITHIUM SECONDARY BATTERY CONTAINING SAME

TECHNICAL FIELD

The present invention relates to a secondary battery, and particularly, to a lithium secondary battery.

BACKGROUND ART

Secondary batteries are batteries which can be charged as well as discharged and thus repetitively used. A representative lithium secondary battery of the secondary batteries is operated by the principle in which lithium ions included in a cathode active material of a cathode are moved to an anode through an electrolyte and inserted into a layered structure of a anode active material (charging), and the lithium ions inserted into the layered structure of the anode active material return to the cathode (discharging). Such a lithium secondary battery is now commercially available to be used as a small power supply for a mobile phone, a notebook computer, etc., is also expected to be used as a large power supply for a hybrid car, etc., and is estimated that its demand will increased.

However, a composite metal oxide generally used as the cathode active material in the lithium secondary battery may be degraded by the reaction with the electrolyte. To solve this problem, in Korean Unexamined Patent Application Publication No. 2006-0119382, a cathode active material coated with a heterometal oxide is disclosed.

DISCLOSURE

Technical Problem

Also, a lithium compound remaining on a surface of a cathode active material may produce a reaction product capable of increasing a surface resistance by the reaction with an electrolyte. However, it is estimated that, until now, no method of removing or reducing the lithium compound remaining on the surface of the cathode active material has been reported.

Therefore, an object to be solved by the present invention is to provide a cathode material for a lithium secondary battery, which can reduce an amount of a lithium compound remaining on a surface and inhibit surface degradation by the reaction with an electrolyte, and a lithium secondary battery including the same.

Technical Solution

To accomplish the object, one aspect of the present invention provides a lithium cathode material for a lithium secondary battery. The cathode material for a lithium secondary battery includes a cathode active material and a lithium phosphate layer formed on a surface of the cathode active material.

Another aspect of the present invention provides a method of manufacturing a lithium cathode material for a lithium secondary battery. First, a cathode active material, phosphoric acid, and a solvent are mixed together. The mixture is thermally treated to obtain a cathode active material coated with a lithium phosphate layer.

Still another aspect of the present invention provides a lithium secondary battery. The lithium secondary battery has a cathode composed of a cathode material including a cathode active material and a lithium phosphate layer formed on a surface of the cathode active material. An anode composed of an anode material containing an anode active material in which intercalation and deintercalation of lithium can occur is disposed. An electrolyte is disposed between the cathode and the anode.

The cathode active material may be a lithium-transition metal oxide. Particularly, the cathode active material may be $LiCoO_2$, $LiNiO_2$, $Li(Co_xNi_{1-x})O_2$ ($0.5 \leq x < 1$), $LiMn_2O_4$, $Li_{1+x}Mn_{2-y-z-w}Al_yCo_zMg_wO_4$ ($0.03 < x < 0.25$, $0.01 < y < 0.2$, $0.01 < z < 0.2$, $0 \leq w < 0.1$, and $x+y+z+w < 0.4$), $Li_4Mn_5O_{12}$, or $Li_{1+x}(Ni_{1-y-z}Co_yM_z)_{1-x}O_2$ ($0 \leq x \leq 0.2$, $0.01 \leq y \leq 0.5$, $0.01 \leq z \leq 0.5$, $0 < y+z < 1$, and M is Mn, Ti, Mg or Al). As an example, the cathode active material may be $Li_{1+x}[Ni_y(Co_{0.5}M_{0.5})_{1-y}]_{1-x}O_2$ ($0 \leq x \leq 0.2$, $0.3 \leq y \leq 0.99$, and M is Mn, Ti, Mg or Al). The cathode active material may have a particle form.

The lithium phosphate layer may have a thickness of 5 to 50 nm. A weight percent of the phosphoric acid with respect to the cathode active material may be 0.25 to 1 wt %. From the lithium phosphate layer-coated cathode active material, $LiPO^+$ fragments may be detected through time of flight secondary ion mass spectrometry (ToF-SIMS).

The lithium phosphate layer may be produced by any one of the following reaction formulas.

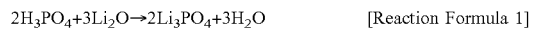
$2H_3PO_4 + 3Li_2O \rightarrow 2Li_3PO_4 + 3H_2O$     [Reaction Formula 1]

$H_3PO_4 + 3LiOH \rightarrow Li_3PO_4 + 3H_2O$     [Reaction Formula 2]

$2H_3PO_4 + 3Li_2CO_3 \rightarrow 2Li_3PO_4 + 3CO_2 + 3H_2O$     [Reaction Formula 3]

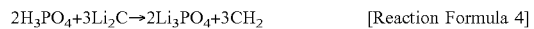
$2H_3PO_4 + 3Li_2C \rightarrow 2Li_3PO_4 + 3CH_2$     [Reaction Formula 4]

In the reaction formulas, $Li_2O$, $LiOH$, $Li_2CO_3$ or $Li_2C$ may be a lithium compound remaining on the cathode active material.

Before the thermal treatment of the mixture, the solvent may be evaporated. In the evaporation operation, $H_2O$, $CO_2$ or $CH_2$ produced by at least one of Reaction Formulas 1 to 4 may also be evaporated. The solvent may be a volatile solvent. The volatile solvent may be ethanol, acetone, or a mixture thereof.

Advantageous Effects

According to the present invention, a lithium phosphate layer is formed on a surface of a cathode active material, and can serve to protect the cathode active material without inhibiting movement of lithium ions. Degradation of the cathode active material caused by a side reaction with an electrolyte can be prevented by consuming a remaining lithium compound in the process of forming the lithium phosphate layer, and the formed lithium phosphate layer can protect the cathode active material without interfering with the movement of the lithium ions.

DESCRIPTION OF DRAWINGS

FIG. 1 is a flowchart illustrating a method of manufacturing a cathode according to an embodiment of the present invention.

FIG. 2 is a graph showing an XRD analysis result for lithium phosphate-coated $Li[Ni_{0.6}Co_{0.2}Mn_{0.2}]O_2$ powder according to Preparation Example 1 and uncoated $Li[Ni_{0.6}Co_{0.2}Mn_{0.2}]O_2$ powder.

FIG. 3 is an image showing the result of energy dispersive spectroscopy (EDS) atomic analysis for the lithium phosphate-coated Li[Ni$_{0.6}$Co$_{0.2}$Mn$_{0.2}$]O$_2$ powder according to Preparation Example 1.

FIG. 4 is a graph showing the result of time of flight secondary ion mass spectrometry (ToF-SIMS) performed to detect LiPO$^+$ fragments of the lithium phosphate-coated Li[Ni$_{0.6}$Co$_{0.2}$Mn$_{0.2}$]O$_2$ powder according to Preparation Example 1 and uncoated Li[Ni$_{0.6}$Co$_{0.2}$Mn$_{0.2}$]O$_2$ powder.

FIG. 5 is a graph showing the ToF-SIMS result performed to detect the Li$_2$OH$^+$ fragments of the lithium phosphate-coated Li[Ni$_{0.6}$Co$_{0.2}$Mn$_{0.2}$]O$_2$ powder according to Preparation Example 1 and uncoated Li[Ni$_{0.6}$Co$_{0.2}$Mn$_{0.2}$]O$_2$ powder.

FIG. 6 is a graph showing the variation in discharge capacity and number of cycles for half cells according to Preparation Example 9 and Comparative Example 1.

FIG. 7 is a graph showing the variation in discharge capacity and number of cycles for half cells according to Preparation Example 11 and Comparative Example 3.

FIG. 8 is a graph showing the variation in discharge capacity and number of cycles for half cells according to Preparation Example 12 and Comparative Example 4.

FIG. 9 is a graph showing the variation in discharge capacity and number of cycles for the half cells according to Preparation Example 9 and Comparative Example 1.

FIGS. 10a and 10b are a graph showing the impedance characteristic, that is, a Cole-Cole plot of alternating current impedance of the half cells according to Preparation Example 9 and Comparative Example 1.

FIG. 11a shows transmission electron microscope (TEM) images of a surface of the lithium phosphate-coated Li[Ni$_{0.6}$Co$_{0.2}$Mn$_{0.2}$]O$_2$ powder prepared in Preparation Example 1 before and after charge/discharge tests, and FIG. 11b shows TEM images of a surface of uncoated Li[Ni$_{0.6}$Co$_{0.2}$Mn$_{0.2}$]O$_2$ powder before and after charge/discharge tests.

FIG. 12 shows a TEM image of a surface of lithium phosphate-coated Li[Ni$_{0.6}$Co$_{0.2}$Mn$_{0.2}$]O$_2$ powder prepared in Preparation Example 5 and a graph showing the variation in discharge capacity and number of cycles for half cells according to Preparation Example 13 and Comparative Example 1.

FIG. 13 is a TEM image of a surface of lithium phosphate-coated Li[Ni$_{0.6}$Co$_{0.2}$Mn$_{0.2}$]O$_2$ powder prepared in Preparation Example 8 and a graph showing the variation in discharge capacity and number of cycles for half cells according to Preparation Example 16 and Comparative Example 1.

FIG. 14 is a graph showing the variation of discharge capacity and number of cycles for the half cells according to Preparation Examples 9, and 13 to 16 and Comparative Example 1.

EMBODIMENTS OF THE INVENTION

Hereinafter, to more fully explain the present invention, embodiments according to the present invention will be described in further detail with reference to the accompanying drawings. However, the present invention may be embodied in different forms without limitation to the embodiments explained herein. Like reference numerals denote like elements throughout the specification.

In the specification, the sentence "a first layer is disposed "on" a second layer" means that these layers are in direct contact with each other, and a third layer(s) is/are disposed between these layers.

The lithium secondary battery according to an embodiment of the present invention includes a cathode, an anode containing an anode active material in which extraction or insertion of lithium can occur, and an electrolyte disposed between the electrodes.

<Cathode>

The cathode of the lithium secondary battery according to an embodiment of the present invention contains a cathode material including a cathode active material and a lithium phosphate layer formed on a surface thereof. Particularly, the lithium phosphate layer is formed on the surfaces of particles of the cathode active material, and the cathode or cathode material may include the particles of the cathode active material, which are coated with the lithium phosphate layer.

The cathode active material may be a lithium-transition metal oxide. The lithium-transition metal oxide may be, for example, LiCoO$_2$, LiNiO$_2$, Li(Co$_x$Ni$_{1-x}$)O$_2$(0.5≤x<1), LiMn$_2$O$_4$, Li$_{1+x}$Mn$_{2-y-z-w}$Al$_y$Co$_z$Mg$_w$O$_4$(0.03<x<0.25, 0.01<y<0.2, 0.01<z<0.2, 0≤w<0.1, and x+y+z+w<0.4), Li$_4$Mn$_5$O$_{12}$, or Li$_{1+x}$(Ni$_{1-y-z}$Co$_y$M$_z$)$_{1-x}$O$_2$(0≤x≤0.2, 0.01≤y≤0.5, 0.01≤z≤0.5, 0<y+z<1, and M is Mn, Ti, Mg or Al). However, the present invention is not limited thereto.

In one example, the lithium-transition metal oxide may be Li$_{1+x}$(Ni$_{1-y-z}$Co$_y$M$_z$)$_{1-x}$O$_2$(0≤x≤0.2, 0.01≤y≤0.5, 0.01≤z≤0.5, 0<y+z<1, and M is Mn, Ti, Mg or Al) among the above, which reduces a content of a rare and high-priced metal, that is, Co, and exhibits high thermal stability and capacity, and excellent reversibility. Particularly, the cathode active material, which is a lithium-transition metal oxide, may be Li$_{1+x}$[Ni$_y$(Co$_{0.5}$M$_{0.5}$)$_{1-y}$]$_{1-x}$O$_2$ (0≤x≤0.2, 0.3≤y≤0.99, and M is Mn, Ti, Mg or Al).

The lithium phosphate layer formed on the surface of the cathode active material particle may have a thickness of about 5 to 50 nm, for example, about 5 to 20 nm. Such a lithium phosphate layer may protect the surface of the cathode active material particles to prevent degradation.

FIG. 1 is a flowchart illustrating a method of manufacturing a cathode according to an embodiment of the present invention.

Referring to FIG. 1, a cathode active material may be prepared (S1). The cathode active material may be cathode active material particles formed in a particle form. Particularly, when metal oxides or metal compounds may be mixed and sintered, thereby obtaining the cathode active material. The metal compounds may be metal salts that become metal oxides when degraded and/or oxidized. The cathode active material may be the lithium-transition metal oxide described above. Afterward, additionally, the cathode active material may be ground. Here, it is preferable that the cathode active material is not in contact with water.

The cathode active material, phosphoric acid (H$_3$PO$_4$), and a solvent may be mixed and thermally treated, thereby obtaining a lithium phosphate-coated cathode active material, particularly, lithium phosphate-coated cathode active material particles (S3). In detail, at least one lithium compound, for example, lithium oxide (Li$_2$O), lithium hydroxide (LiOH), lithium carbonate (Li$_2$Co$_3$) or lithium carbide (Li2C), that does not form an oxide with a transition metal and thus remains may exist on a surface of the cathode active material, which is the lithium-transition metal oxide. The residual lithium compound may react with a specific material in the electrolyte in the secondary battery, and a reaction product obtained thereby may be accumulated on the surface of the cathode active material. The reaction product may interfere with the movement of lithium ions. As an example, the residual lithium compound may react with HF in the electrolyte to produce LiF.

However, as described above, when the cathode active material is mixed with phosphoric acid ($H_3PO_4$) and then thermally treated, the lithium compound remaining on the surface of the cathode active material may react with phosphoric acid ($H_3PO_4$), resulting in lithium phosphate. In one example, when the residual lithium compound is lithium oxide ($Li_2O$), lithium hydroxide (LiOH), lithium carbonate ($Li_2CO_3$), or lithium carbide ($Li_2C$), lithium phosphate may be produced by the following reaction formulas.

$2H_3PO_4 + 3Li_2O \rightarrow 2Li_3PO_4 + 3H_2O$ [Reaction Formula 1]

$H_3PO_4 + 3LiOH \rightarrow Li_3PO_4 + 3H_2O$ [Reaction Formula 2]

$2H_3PO_4 + 3Li_2CO_3 \rightarrow 2Li_3PO_4 + 3CO_2 + 3H_2O$ [Reaction Formula 3]

$2H_3PO_4 + 3Li_2C \rightarrow 2Li_3PO_4 + 3CH_2$ [Reaction Formula 4]

In the reaction formulas, $Li_2O$, LiOH, $Li_2CO_3$ or $Li_2C$ may be a lithium compound remaining on the cathode active material.

Accordingly, the surface of the cathode active material may be coated with a lithium phosphate layer. The lithium phosphate layer may have a thickness of 5 to 100 nm, and specifically, 5 to 50 nm. The lithium phosphate layer may serve to protect the cathode active material without interfering with the movement of lithium ions. As described above, the degradation of the cathode active material caused by a side reaction with an electrolyte may be prevented by consuming the residual lithium compound in the operation of forming the lithium phosphate layer, and the formed lithium phosphate layer may protect the cathode active material without interfering with the movement of the lithium ions.

A specific method for obtaining the lithium phosphate layer-coated cathode active material is as follows. A phosphoric acid solution may be prepared by adding phosphoric acid to a solvent and sufficiently mixing the mixture, and the cathode active material may be added to the phosphoric acid solution. The solvent may be a volatile solvent, for example, ethanol, acetone, or a mixture thereof. Specifically, the solvent may be anhydrous ethanol. In this case, prior to thermal treatment after the cathode active material is mixed with the phosphoric acid solution (S3), an operation of sufficiently evaporating the volatile solvent may be performed. When the volatile solvent is evaporated, a by-product produced during the formation of the lithium phosphate ($H_2O$, $CO_2$, or $CH_2$ in the-above reaction formulas) may be evaporated with the volatile solvent. The volatile solvent may be evaporated at 60 to 200° C. The thermal treatment may be performed at about 400 to 700° C. for about 3 to 5 hours.

Afterward, a lithium phosphate-coated cathode active material, a conductive material, and a binder are mixed, thereby obtaining a cathode material (S5). Here, the conductive material may be a carbon material such as natural graphite, artificial graphite, cokes, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer or hexafluoropropylene, and/or a polyolefin resin such as polyethylene or polypropylene.

The cathode material may be formed on a cathode collector to form a cathode (S7). The cathode collector may be a conductive material such as Al, Ni, or stainless steel. To apply the cathode material onto the cathode collector, pressure molding; or a method of preparing a paste using an organic solvent, applying the paste onto the collector, and fixing the paste by pressing may be used. The organic solvent may be a polar aprotic solvent: an amine-based solvent such as N,N-dimethylaminopropylamine, or diethyltriamine; an ether-based solvent such as ethyleneoxide or tetrahydrofuran; a ketone-based solvent such as methylethylketone; an ester-based solvent such as methylacetate; or dimethylacetamide or N-methyl-2-pyrrolidone. The application of the paste on the cathode collector may be performed by, for example, gravure coating, slit dye coating, knife coating, or spray coating.

<Anode>

An anode active material may be prepared using a metal, a metal alloy, a metal oxide, a metal fluoride, a metal sulfide, or a carbon material such as natural graphite, artificial graphite, cokes, carbon black, carbon nanotubes, or graphene, in which the intercalation and deintercalation of lithium ions or a conversion reaction may occur.

An anode material may be obtained by mixing the anode active material, a conductive material, and a binder. Here, the conductive material may be a carbon material such as natural graphite, artificial graphite, cokes, carbon black, carbon nanotubes, or graphene. The binder may include a thermoplastic resin, for example, a fluoride resin such as polyvinylidene fluoride, polytetrafluoroethylene, tetrafluoroethylene, a vinylidene fluoride-based copolymer, or hexafluoropropylene, and/or a polyolefin resin such as polyethylene or polypropylene.

An anode may be formed by applying the anode material onto the anode collector. The anode collector may be a conductive material such as Al, Ni, Cu, or stainless steel. To apply the anode material onto the anode collector, pressure molding; or a method of preparing a paste using an organic solvent, applying the paste onto the collector, and fixing the paste by pressing may be used. The organic solvent may be a polar aprotic solvent: an amine-based solvent such as N,N-dimethylaminopropylamine, or diethyltriamine; an ether-based solvent such as ethyleneoxide or tetrahydrofuran; a ketone-based solvent such as methylethylketone; an ester-based solvent such as methylacetate; or dimethylacetamide or N-methyl-2-pyrrolidone. The application of the paste on the anode collector may be performed by, for example, gravure coating, slit dye coating, knife coating, or spray coating.

<Electrolyte>

An electrolyte may contain a lithium salt and a non-aqueous electrolyte.

The lithium salt may be a material suitable for being dissolved in the non-aqueous electrolyte, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carbonic acid lithium, or tetraphenyl lithium borate.

The non-aqueous electrolyte may be a non-aqueous electrolyte solution, an organic solid electrolyte, or an inorganic solid electrolyte. The non-aqueous electrolyte solution may be an aprotic organic solvent, for example, N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolan, formamide, dimethylformamide, dioxolan, acetonitrile, nitromethane, methyl formate, methyl acetate, triester phosphate, trimethoxy methane, a dioxolan derivative, sulfolane, methyl sulfolane, 1,3-dimethyl-2-imidazolidinone, a propylene carbonate derivative, a tetrahydrofuran derivative, ether, methyl propionic acid, or ethyl propionic acid. The organic solid electrolyte may be, for example, a polyethylene derivative, a polyethylene oxide derivative, a polypropylene oxide derivative, a phosphoric ester polymer, a poly agitation lysine, a polyester sulfide, a polyvinyl alcohol, a poly vinylidene fluoride, or a polymer containing an ionic dissociable group. The inorganic solid electrolyte may be, for example, a nitride, halide or sulfide of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The stability of the secondary battery may be further increased using such a solid electrolyte. Also, the solid electrolyte may serve as a separator which will be described below, and in this case, a separator may not be required.

<Separator>

A separator may be disposed between the cathode and the anode. Such a separator may be a material having a form of a porous film composed of a material such as a polyolefin resin such as polyethylene or polypropylene, a fluorine resin, or a nitrogen-containing aromatic polymer, a non-woven fabric, or a woven fabric. As long as a mechanical strength is maintained, the thickness of the separator is preferably small because of a high volume energy density of a battery and a small internal resistance. The thickness of the separator may be, generally, about 5 to 200 μm, and particularly, 5 to 40 μm.

<Method of Manufacturing Lithium Secondary Battery>

A secondary battery may be manufactured by forming an electrode group by sequentially stacking the cathode, the separator, and the anode, accommodating the electrode group, which is rolled, if needed, into a battery can, and immersing the electrode group in the electrolyte. On the other hand, a secondary battery may be manufactured by forming an electrode group by stacking the cathode, the solid electrolyte, and the anode, and rolling the electrode group, if needed, and accommodating the electrode group in a battery can.

Hereinafter, examples are provided to help in understanding the present invention. However, the following examples are merely provided to help in understanding of the present invention, and the present invention is not limited to the following examples.

EXAMPLES

Preparation Example 1

Lithium Phosphate-Coated $Li[Ni_{0.6}Co_{0.2}Mn_{0.2}]O_2$

Phosphoric acid ($H_3PO_4$) was quantified in a weight fraction of 0.25 wt % based on 1 g of a cathode active material, $Li[Ni_{0.6}Co_{0.2}Mn_{0.2}]O_2$. The quantified phosphoric acid was put into 300 ml of anhydrous ethanol ($CH_3CH_2OH$). Afterward, the phosphoric acid and the anhydrous ethanol were sufficiently mixed by stirring with an impeller at 30° C., and 10 g of $Li[Ni_{0.6}Co_{0.2}Mn_{0.2}]O_2$ was added to the mixed solution. Afterward, while the temperature was increased until the solvent, anhydrous ethanol, was completely evaporated, the resultant solution was stirred to continuously react. After the solvent was completely evaporated, the resultant solution was thermally treated at about 400° C. or higher for about 3 or more hours, thereby preparing a lithium phosphate-coated cathode active material.

Preparation Example 2

Lithium Phosphate-Coated $Li[Ni_{0.7}Co_{0.2}Mn_{0.1}]O_2$

A lithium phosphate-coated cathode active material was prepared by substantially the same method as Preparation Example 1, except that $Li[Ni_{0.7}Co_{0.2}Mn_{0.1}]O_2$ was used as a cathode active material. In detail, based on 1 g of the cathode active material, $Li[Ni_{0.7}Co_{0.2}Mn_{0.1}]O_2$, phosphoric acid ($H_3PO_4$) was quantified in a weight fraction of 0.25 wt %, and 10 g of $Li[Ni_{0.7}Co_{0.2}Mn_{0.1}]O_2$ was added to a phosphoric acid-anhydrous ethanol solution, which was mixed by stirring at 30° C.

Preparation Example 3

Lithium Phosphate-Coated $Li[Ni_{0.8}Co_{0.1}Al_{0.1}]O_2$

A lithium phosphate-coated cathode active material was prepared by substantially the same method as Preparation Example 1, except that $Li[Ni_{0.8}Co_{0.1}Al_{0.1}]O_2$ was used as a cathode active material. In detail, based on 1 g of the cathode active material, $Li[Ni_{0.8}Co_{0.1}Al_{0.1}]O_2$, phosphoric acid ($H_3PO_4$) was quantified in a weight fraction of 0.25 wt %, and 10 g of $Li[Ni_{0.8}Co_{0.1}Al_{0.1}]O_2$ was added to a phosphoric acid-anhydrous ethanol solution, which was mixed by stirring at 30° C.

Preparation Example 4

Lithium Phosphate-Coated $LiCoO_2$

A lithium phosphate-coated cathode active material was prepared by substantially the same method as Preparation Example 1, except that $LiCoO_2$ was used as a cathode active material. In detail, based on 1 g of the cathode active material, $LiCoO_2$, phosphoric acid ($H_3PO_4$) was quantified in a weight fraction of 0.25 wt %, and 10 g of $LiCoO_2$ was added to a phosphoric acid-anhydrous ethanol solution, which was mixed by stirring at 30° C.

Preparation Example 5

Lithium Phosphate-Coated $Li[Ni_{0.6}Co_{0.2}Mn_{0.2}]O_2$

A lithium phosphate-coated cathode active material was prepared by substantially the same method as Preparation Example 1, except that phosphoric acid ($H_3PO_4$) was quantified in a weight fraction of 0.1 wt % based on 1 g of a cathode active material, $Li[Ni_{0.6}Co_{0.2}Mn_{0.2}]O_2$.

Preparation Example 6

Lithium Phosphate-Coated $Li[Ni_{0.6}Co_{0.2}Mn_{0.2}]O_2$

A lithium phosphate-coated cathode active material was prepared by substantially the same method as Preparation Example 1, except that phosphoric acid ($H_3PO_4$) was quantified in a weight fraction of 1 wt % based on 1 g of a cathode active material, $Li[Ni_{0.6}Co_{0.2}Mn_{0.2}]O_2$.

Preparation Example 7

Lithium Phosphate-Coated $Li[Ni_{0.6}Co_{0.2}Mn_{0.2}]O_2$

A lithium phosphate-coated cathode active material was prepared by substantially the same method as Preparation Example 1, except that phosphoric acid ($H_3PO_4$) was quantified in a weight fraction of 2 wt % based on 1 g of a cathode active material, $Li[Ni_{0.6}Co_{0.2}Mn_{0.2}]O_2$.

Preparation Example 8

Lithium Phosphate-Coated $Li[Ni_{0.6}Co_{0.2}Mn_{0.2}]O_2$

A lithium phosphate-coated cathode active material was prepared by substantially the same method as Preparation Example 1, except that phosphoric acid ($H_3PO_4$) was quantified in a weight fraction of 5 wt % based on 1 g of a cathode active material, $Li[Ni_{0.6}Co_{0.2}Mn_{0.2}]O_2$.

Preparation Examples 9 to 16

Cathode and Half Cell Using Lithium Phosphate-Coated Cathode Active Material

A cathode was formed by forming a cathode active material slurry composition which was formed by mixing the lithium phosphate-coated cathode active material prepared in any one of Preparation Examples 1 to 8, Super-P carbon black and acetylene black as conductive materials, and a binder (poly vinylidene fluoride; PVDF) in a weight fraction of 8:0.5:0.5:1 in an organic solvent (N-methyl-2-pyrrolidone (NMP)), and coating and drying the composition on an aluminum foil collector.

Afterward, a CR2032 coin battery was manufactured by a conventional process of manufacturing a lithium secondary battery using an anode, which is a lithium metal, a non-aqueous electrolyte solution in which 1.15 moles of $LiPF_6$ as an electrolyte was dissolved in a non-aqueous electrolyte solvent, which is a mixed solvent of ethylene carbonate and dimethyl carbonate (volume ratio of 3:7), and a separator disposed between the cathode and the anode.

In Table 1, characteristics of the manufacturing methods in Preparation Examples 1 to 16 are summarized.

Comparative Example 1

Manufacture of Cathode and Half Cell Using Non-Lithium Phosphate-Coated $Li[Ni_{0.6}Co_{0.2}Mn_{0.2}]O_2$ A cathode and a half cell were manufactured by substantially the same method as Preparation Example 9, except that non-lithium phosphate-coated $Li[Ni_{0.6}Co_{0.2}Mn_{0.2}]O_2$ was used as a cathode active material.

Comparative Example 2

Manufacture of Cathode and Half Cell Using Non-Lithium Phosphate-Coated $Li[Ni_{0.7}Co_{0.2}Mn_{0.1}]O_2$ A cathode and a half cell were manufactured by substantially the same method as Preparation Example 10, except non-lithium phosphate-coated $Li[Ni_{0.7}Co_{0.2}Mn_{0.1}]O_2$ was used as a cathode active material.

Comparative Example 3

Manufacture of Cathode and Half Cell Using Non-Lithium Phosphate-Coated $Li[Ni_{0.8}Co_{0.1}Al_{0.1}]O_2$ A cathode and a half cell were manufactured by substantially the same method as Preparation Example 11, except non-lithium phosphate-coated $Li[Ni_{0.8}Co_{0.1}Al_{0.1}]O_2$ was used as a cathode active material.

Comparative Example 4

Manufacture of Cathode and Half Cell Using Non-Lithium Phosphate-Coated $LiCoO_2$ A cathode and a half cell were manufactured by substantially the same method as Preparation Example 12, except non-lithium phosphate-coated $LiCoO_2$ was used as a cathode active material.

FIG. 2 is a graph showing an XRD analysis result for lithium phosphate-coated $Li[Ni_{0.6}Co_{0.2}Mn_{0.2}]O_2$ powder according to Preparation Example 1 and uncoated $Li[Ni_{0.6}Co_{0.2}Mn_{0.2}]O_2$ powder.

Referring to 2, it can be seen that lithium phosphate-coated $Li[Ni_{0.6}Co_{0.2}Mn_{0.2}]O_2$ powder (or particles) has the same crystal structure as non-phosphate-coated $Li[Ni_{0.6}Co_{0.2}Mn_{0.2}]O_2$ powder (or particles). From such a result, it can be seen that a lithium phosphate coating layer does not have a crystal structure.

TABLE 1

Preparation Examples for lithium phosphate-coated cathode active material

| | Type of cathode active material | Weight percent of phosphoric acid with respect to cathode active material | Related Preparation Examples for Cathode and half cell |
|---|---|---|---|
| Preparation Example 1 | $Li[Ni_{0.6}Co_{0.2}Mn_{0.2}]O_2$ | 0.25 wt % | Preparation Example 9 |
| Preparation Example 2 | $Li[Ni_{0.7}Co_{0.2}Mn_{0.1}]O_2$ | | Preparation Example 10 |
| Preparation Example 3 | $Li[Ni_{0.8}Co_{0.1}Al_{0.1}]O_2$ | | Preparation Example 11 |
| Preparation Example 4 | $LiCoO_2$ | | Preparation Example 12 |
| Preparation Example 5 | $Li[Ni_{0.6}Co_{0.2}Mn_{0.2}]O_2$ | 0.1 wt % | Preparation Example 13 |
| Preparation Example 6 | | 1 wt % | Preparation Example 14 |
| Preparation Example 7 | | 2 wt % | Preparation Example 15 |
| Preparation Example 8 | | 5 wt % | Preparation Example 16 |

FIG. 3 is an image showing the result of energy dispersive spectroscopy (EDS) atomic analysis for the lithium phosphate-coated Li[Ni$_{0.6}$Co$_{0.2}$Mn$_{0.2}$]O$_2$ powder according to Preparation Example 1.

FIG. 4 is a graph showing the result of ToF-SIMS performed to detect LiPO$^+$ fragments of the lithium phosphate-coated Li[Ni$_{0.6}$Co$_{0.2}$Mn$_{0.2}$]O$_2$ powder according to Preparation Example 1 and uncoated Li[Ni$_{0.6}$Co$_{0.2}$Mn$_{0.2}$]O$_2$ powder.

Referring to FIG. 4, it can be seen that LiPO$^+$ fragments indicating lithium phosphate are detected in lithium phosphate (Li$_3$PO$_4$)-coated Li[Ni$_{0.6}$Co$_{0.2}$Mn$_{0.2}$]O$_2$ powder (or particles), but are not detected in non-coated Li[Ni$_{0.6}$Co$_{0.2}$Mn$_{0.2}$]O$_2$ powder (or particles). Other than the LiPO$^+$ fragments detected in the experiment, when lithium phosphate is coated, various Li$_x$PO$_y^+$ fragments indicating lithium phosphate (x may be 1 to 3, particularly, an integer from 1 to 3, and y may be 1 to 4, particularly, an integer from 1 to 4), for example, Li$_2$PO$_2^+$, Li$_2$PO$^+$, LiPO$_2^+$, etc. may be detected.

FIG. 5 is a graph showing the ToF-SIMS result performed to detect Li$_2$OH$^+$ fragments of the lithium phosphate-coated Li[Ni$_{0.6}$Co$_{0.2}$Mn$_{0.2}$]O$_2$ powder according to Preparation Example 1 and uncoated Li[Ni$_{0.6}$Co$_{0.2}$Mn$_{0.2}$]O$_2$ powder. The detection of Li$_2$OH$^+$ fragments can allow the confirmation of the presence of LiOH in the lithium compounds remaining on the surface of the Li[Ni$_{0.6}$Co$_{0.2}$Mn$_{0.2}$]O$_2$ powder.

Referring to FIG. 5, it can be seen that a detection amount of the Li$_2$OH$^+$ fragments from the lithium phosphate-coated Li[Ni$_{0.6}$Co$_{0.2}$Mn$_{0.2}$]O$_2$ powder is greatly reduced, compared to that of the non-coated Li[Ni$_{0.6}$Co$_{0.2}$Mn$_{0.2}$]O$_2$ powder. This means that the amount of the lithium compounds remaining on the surface of the Li[Ni$_{0.6}$Co$_{0.2}$Mn$_{0.2}$]O$_2$ powder is greatly reduced by lithium phosphate coating.

Table 2 shows the amounts of lithium remaining on a surface of the cathode active material before and after the lithium phosphate coating in the processes of preparing the lithium phosphate-coated cathode active materials according to Preparation Examples 1 to 4. The amount of the residual lithium shown in Table 2 is an average value of the values measured by a Warder method five times based on 50 g.

TABLE 2

| | | Amount of residual lithium (unit: ppm) | | | | |
|---|---|---|---|---|---|---|
| | Lithium phosphate coating | LiOH | Li$_2$CO$_3$ | Total residual lithium | Comparison | Preparation Example |
| Li[Ni$_{0.6}$Co$_{0.2}$Mn$_{0.2}$]O$_2$ | After coating | 1197 | 738 | 1935 | 47% reduced | Preparation Example 1 |
| | Before coating | 1436 | 2216 | 3652 | | |
| Li[Ni$_{0.7}$Co$_{0.2}$Mn$_{0.1}$]O$_2$ | After coating | 2633 | 2955 | 5588 | 50% reduced | Preparation Example 2 |
| | Before coating | 4548 | 6649 | 11197 | | |
| Li[Ni$_{0.8}$Co$_{0.1}$Al$_{0.1}$]O$_2$ | After coating | 2458 | 4325 | 6783 | 50% reduced | Preparation Example 3 |
| | Before coating | 5938 | 7532 | 13470 | | |
| LiCoO$_2$ | After coating | 324 | 1134 | 1458 | 54% reduced | Preparation Example 4 |
| | Before coating | 598 | 2543 | 3141 | | |

Referring to Table 2, from all of the lithium phosphate-coated cathode active materials prepared in Preparation Examples 1 to 4, the amounts of residual lithium were about 50% reduced, compared to those before coating. Meanwhile, it seems that, as the nickel content is increased cathode active material, the amount of residual lithium is increased.

FIG. 6 is a graph showing the variation in discharge capacity and number of cycles for half cells according to Preparation Example 9 and Comparative Example 1. Here, charging and discharging were performed in an electric potential range of 3.0 to 4.3 V at a current density of 170 mA/g for a total of 100 cycles.

Referring to 6, it can be seen that discharge capacity of a half cell according to Comparative Example 1 using uncoated Li[Ni$_{0.6}$Co$_{0.2}$Mn$_{0.2}$]O$_2$ powder as a cathode active material is greatly reduced (84% at 100 cycles) as the number of charge/discharge cycles is increased. In comparison, it can be seen that a half cell according to Preparation Example 9 using lithium phosphate-coated Li[Ni$_{0.6}$Co$_{0.2}$Mn$_{0.2}$]O$_2$ powder as a cathode active material still exhibits a much higher retention (94% at 100 cycles) of the discharge capacity, even if the number of charge/discharge cycles is increased.

FIG. 7 is a graph showing the variation in discharge capacity and number of cycles for half cells according to Preparation Example 11 and Comparative Example 3. Here, charging and discharging were performed in an electric potential range of 3.0 to 4.3 V at a current density of 190 mA/g for a total of 100 cycles.

Referring to FIG. 7, it can be seen that a half cell according to Comparative Example 3 using uncoated Li[Ni$_{0.8}$Co$_{0.1}$Al$_{0.1}$]O$_2$ powder as a cathode active material is greatly reduced as the number of charge/discharge cycles is increased (67.8% at 100 cycles). In comparison, it can be seen that a half cell according to Preparation Example 11 using lithium phosphate-coated Li[Ni$_{0.8}$Co$_{0.1}$Al$_{0.1}$]O$_2$ powder as a cathode active material still exhibits a much higher retention of the discharge capacity, even if the number of charge/discharge cycles is increased (90.3% at 100 cycles).

As described above, the half cell according to Preparation Example 11 using the lithium phosphate-coated Li[Ni$_{0.8}$Co$_{0.1}$Al$_{0.1}$]O$_2$ powder as the cathode active material may exhibit an excellent lifetime characteristic. It is very meaningful that such an effect is realized even in the case of 80% nickel.

FIG. 8 is a graph showing the variation in discharge capacity and number of cycles for half cells according to Preparation Example 12 and Comparative Example 4. Here, charging and discharging were performed in an electric potential range of 3.0 to 4.5 V at a current density of 150 mA/g for a total of 100 cycles.

Referring to FIG. 8, it can be seen that a half cell according to Comparative Example 4 using uncoated LiCoO$_2$ powder as a cathode active material is greatly reduced as the number of charge/discharge cycles is increased (31.5% at 100 cycles). In comparison, it can be seen that a half cell according to Preparation Example 12 using lithium phosphate-coated LiCoO$_2$ powder as a cathode active material still exhibits a much higher retention of the discharge capacity, even if the number of charge/discharge cycles is increased (95.3% at 100 cycles).

FIG. 9 is a graph showing the variation in discharge capacity and number of cycles for the half cells according to Preparation Example 9 and Comparative Example 1. Here, charging was performed to approach 4.3 V at a current density of 20 mA/g, and discharging was performed at current densities of 1C (170 mA/g), 2C (340 mA/g), 3C (510 mA/g), 5C (850 mA/g), 7C (1190 mA/g), and 10C (1700 mA/g). The charging and discharging were performed 5 cycles at each C-rate.

Referring to FIG. 9, as a result of an experiment with an increased C-rate (that is, with an increased discharge rate), it can be seen that the half cell according to Preparation Example 9 using lithium phosphate-coated Li[Ni$_{0.6}$Co$_{0.2}$Mn$_{0.2}$]O$_2$ powder as a cathode active material exhibits a better rate capability than the half cell according to Comparative Example 1 using uncoated Li[Ni$_{0.6}$Co$_{0.2}$Mn$_{0.2}$]O$_2$ powder as a cathode active material.

FIGS. 10a and 10b are a graph showing the impedance characteristic, that is, a Cole-Cole plot of alternating current impedance of the half cells according to Preparation Example 9 and Comparative Example 1.

Referring to FIGS. 10a and 10b, it can be seen that the half cell according to Comparative Example 1 using non-lithium phosphate-coated Li[Ni$_{0.6}$Co$_{0.2}$Mn$_{0.2}$]O$_2$ powder as a cathode active material (FIG. 10b) is increased in resistance as the number of cycles is increased, but the half cell according to Preparation Example 9 using lithium phosphate-coated Li[Ni$_{0.6}$Co$_{0.2}$Mn$_{0.2}$]O$_2$ powder as a cathode active material (FIG. 10a) is limitedly increased in resistance as the number of cycles is increased.

FIG. 11a shows transmission electron microscope (TEM) images of a surface of the lithium phosphate-coated Li[Ni$_{0.6}$Co$_{0.2}$Mn$_{0.2}$]O$_2$ powder prepared in Preparation Example 1 before and after charge/discharge tests, and FIG. 11b shows TEM images of a surface of uncoated Li[Ni$_{0.6}$Co$_{0.2}$Mn$_{0.2}$]O$_2$ powder before and after charge/discharge tests. The charge/discharge test is performed for 100 cycles at room temperature and a current density of 170 mA/g, after the half cells were manufactured using the cathode active materials according to Preparation Example 9 and Comparative Example 1.

Referring to FIGS. 11a and 11b, it was confirmed that, in the cathode active material manufactured in Preparation Example 1, a surface of the Li[Ni$_{0.6}$Co$_{0.2}$Mn$_{0.2}$]O$_2$ powder is coated with lithium phosphate to a thickness of 5 to 20 nm before the charge/discharge test (FIG. 11a). Also, it can be seen that, while the surface of the lithium phosphate-coated Li[Ni$_{0.6}$Co$_{0.2}$Mn$_{0.2}$]O$_2$ powder is very clean after the test (FIG. 11a), the surface of the uncoated Li[Ni$_{0.6}$Co$_{0.2}$Mn$_{0.2}$]O$_2$ powder is very dirty due to various by-products (FIG. 11b). Such a by-product is produced by the reaction with an electrolyte during the test, and the cathode active material may be degraded due to the by-product.

FIG. 12 shows a TEM image of a surface of lithium phosphate-coated Li[Ni$_{0.6}$Co$_{0.2}$Mn$_{0.2}$]O$_2$ powder prepared in Preparation Example 5 and a graph showing the variation in discharge capacity and number of cycles for half cells according to Preparation Example 13 and Comparative Example 1. Here, the charging and discharging were performed in an electric potential range from 3.0 to 4.3 V at a current density of 170 mA/g for a total of 100 cycles.

Referring to FIG. 12, as a result of adjusting the weight percent of phosphoric acid with respect to Li[Ni$_{0.6}$Co$_{0.2}$Mn$_{0.2}$]O$_2$ to 0.1 wt % (Preparation Example 5), it can be confirmed that a surface of the Li[Ni$_{0.6}$Co$_{0.2}$Mn$_{0.2}$]O$_2$ powder is coated with a lithium phosphate layer to a thickness of about 1 nm, and it can be seen that a half cell (Preparation Example 13) using the same exhibits a somewhat excellent discharge capacity in an early stage of charging/discharging, but exhibits almost the same discharge capacity retention after 20 cycles, compared to the non-lithium phosphate-coated Comparative Example 1.

FIG. 13 is a TEM image of a surface of lithium phosphate-coating Li[Ni$_{0.6}$Co$_{0.2}$Mn$_{0.2}$]O$_2$ powder prepared in Preparation Example 8 and a graph showing the variation in discharge capacity and number of cycles for half cells according to Preparation Example 16 and Comparative Example 1. Here, the charging and discharging were performed in an electric potential range from 3.0 to 4.3 V at a current density of 170 mA/g for a total of 100 cycles.

Referring to FIG. 13, as a result of adjusting the weight percent of phosphoric acid with respect to Li[Ni$_{0.6}$Co$_{0.2}$Mn$_{0.2}$]O$_2$ to 5 wt % (Preparation Example 8), it can be confirmed that a surface of the Li[Ni$_{0.6}$Co$_{0.2}$Mn$_{0.2}$]O$_2$ powder is coated with a lithium phosphate layer to a thickness of about 25 to 30 nm, and it can be seen that the half cell (Preparation Example 16) using the same exhibits great reduction in discharge capacity even in an early stage of charging/discharging, but exhibits almost the same discharge capacity retention, compared to the non-lithium phosphate-coated Comparative Example 1.

FIG. 14 is a graph showing the variation of discharge capacity and number of cycles for the half cells according to Preparation Examples 9, and 13 to 16 and Comparative Example 1. Here, the charging and discharging were performed in an electric potential range from 3.0 to 4.3 V at a current density of 170 mA/g for a total of 100 cycles.

Referring to FIG. 14, it can be confirmed that, compared to the non-lithium phosphate-coated Comparative Example 1, the half cell (Preparation Example 13) using lithium phosphate-coated Li[Ni$_{0.6}$Co$_{0.2}$Mn$_{0.2}$]O$_2$ powder (the weight percent of phosphoric acid: 0.1 wt %) prepared in Preparation Example 5 exhibits a somewhat excellent discharge capacity in the early stage of charging/discharging, but exhibits almost the same discharge capacity retention after 20 cycles, and the half cell (Preparation Example 15) using the lithium phosphate-coated Li[Ni$_{0.6}$Co$_{0.2}$Mn$_{0.2}$]O$_2$ powder (the weight percent of phosphoric acid: 2 wt %) prepared in Preparation Example 7 exhibits almost the same discharge capacity in the early stage of the charging/discharging and discharge capacity retention. Also, it can also be seen that the half cell (Preparation Example 16) using the lithium phosphate-coated Li[Ni$_{0.6}$Co$_{0.2}$Mn$_{0.2}$]O$_2$ powder prepared in Preparation Example 8 (the weight percent of phosphoric acid: 5 wt %) is greatly decreased in discharge capacity even in the early stage of charging/discharging, and exhibits almost the same discharge capacity retention.

Meanwhile, it can be seen that the half cell (Preparation Example 9) using the lithium phosphate-coated Li[Ni$_{0.6}$Co$_{0.2}$Mn$_{0.2}$]O$_2$ powder (the weight percent of phosphoric acid: 0.25 wt %) prepared in Preparation Example 1 and the half cell (Preparation Example 14) using the lithium phosphate-coated Li[Ni$_{0.6}$Co$_{0.2}$Mn$_{0.2}$]O$_2$ powder (the weight percent of phosphoric acid: 1 wt %) prepared in Preparation Example 6 may have a much higher discharge capacity retention than the non-lithium phosphate-coated Comparative Example 1, even if the number of charge/discharge cycles is increased.

As described above, when the lithium phosphate-coated cathode active material, for example, lithium phosphate-coated Li[Ni$_{0.6}$Co$_{0.2}$Mn$_{0.2}$]O$_2$ powder (Preparation Example 1), lithium phosphate-coated Li[Ni$_{0.7}$Co$_{0.2}$Mn$_{0.1}$]O$_2$ powder (Preparation Example 2), lithium phosphate-coated Li[Ni$_{0.8}$Co$_{0.1}$Al$_{0.1}$]O$_2$ powder (Preparation Example 3), or lithium phosphate-coated LiCoO$_2$ powder (Preparation Example 4), is used as a cathode active material, a discharge capacity retention property, that is, a lifetime property is improved (refer to FIGS. 6, 7, and 8), and a rate capability is improved (refer to FIG. 9). It is determined that in the process of forming a lithium phosphate layer, since a lithium compound remaining on the surface of the cathode active material is consumed, the degradation of the cathode active material caused by a side reaction between the residual lithium compound and the electrolyte is inhibited (refer to FIGS. 11a and 11b), and the formed lithium phosphate layer protects the cathode active material without interfering with the movement of lithium ions. In addition, referring to FIGS. 6, 11a, 12 and 13, it can be seen that a suitable thickness of the lithium phosphate is 5 to 20 nm, and referring to FIG. 14, it can be seen that when the lithium phosphate-coated cathode active material is prepared, a suitable weight percent of phosphoric acid with respect to the cathode active material is 0.25 to 1 wt %.

Previously, embodiments of the present invention have been described in detail, but the present invention is not limited by the above-described embodiments, and may be implemented in various modifications and changes by those of ordinary skill in the art within the technical idea and scope of the present invention.

The invention claimed is:

1. A cathode material comprising particles, wherein one of the particles comprises:
   a core comprising Li-containing cathode active material; and
   a coating layer formed on surfaces of the core,
   wherein the coating layer consists essentially of Li$_3$PO$_4$ and at least one Li-containing compound selected from the group consisting of Li$_2$O, LiOH, Li$_2$CO$_3$ and Li$_2$C,
   wherein with the existence of Li$_3$PO$_4$ in the coating layer the at least one Li-containing compound existing in the particle is in an amount smaller than it would exist in the absence of Li$_3$PO$_4$ as Li of Li$_3$PO$_4$ originates from some of the at least one Li-containing compound existing prior to the formation of Li$_3$PO$_4$.

2. The cathode material of claim 1, wherein the Li-containing cathode active material is selected from the group consisting of LiCoO$_2$, LiNiO$_2$, Li(Co$_x$Ni$_{1-x}$)O$_2$ (0.5≤x<1), LiMn$_2$O$_4$, Li$_{1+x}$Mn$_{2-y-z-w}$Al$_y$Co$_z$Mg$_w$O$_4$ (0.03<x<0.25, 0.01<y<0.2, 0.01<z<0.2, 0≤w<0.1, and x+y+z+w<0.4), Li$_4$Mn$_5$O$_{12}$, or Li$_{1+x}$(Ni$_{1-y-z}$Co$_y$M$_z$)$_{1-x}$O$_2$ (0≤x≤0.2, 0.01≤y≤0.5, 0.01≤z≤0.5, 0<y+z<1, and M is Mn, Ti, Mg or Al).

3. A lithium secondary battery, comprising:
   a cathode comprising the cathode material of claim 1 and a conductive material mixed with the cathode material;
   an anode; and
   an electrolyte in contact with the cathode and the anode.

4. A cathode material comprising particles, wherein one of the particles comprises:
   a core comprising Li-containing cathode active material; and
   a coating layer formed on surfaces of the core,
   wherein the coating layer consists essentially of Li$_3$PO$_4$, LiOH, and Li$_2$CO$_3$.

5. The cathode material of claim 4,
   wherein the Li-containing cathode active material is selected from the group consisting of LiCoO$_2$, LiMn$_2$O$_4$, Li$_{1+x}$Mn$_{2-y-z-w}$Al$_y$Co$_z$Mg$_w$O$_4$ (0.03<x<0.25, 0.01<y<0.2, 0.01<z<0.2, ≤w<0.1, and x+y+z+w<0.4), and Li$_4$Mn$_5$O$_{12}$.

6. The cathode material of claim 5, wherein the Li-containing cathode active material of the core is in a crystalized form, wherein Li$_3$PO$_4$ of the coating layer is not in a crystalized form.

7. The cathode material of claim 5, wherein the coating layer has a thickness of 5 to 50 nm.

8. The cathode material of claim 5, wherein the Li-containing cathode active material comprises a lithium-transition metal oxide, and wherein the existence of Li$_3$PO$_4$ in the coating layer is confirmed with detection of Li$_x$PO$_y^+$ (x is an integer from 1 to 3, and y is an integer from 1 to 4) by time of flight secondary ion mass spectrometry (ToF-SIMS).

9. A cathode for a lithium secondary battery, the cathode comprising:
   the cathode material of claim 5; and
   a conductive material mixed with the cathode material.

10. A lithium secondary battery, comprising:
    a cathode comprising the cathode material of claim 5 and a conductive material mixed with the cathode material;
    an anode; and
    an electrolyte in contact with the cathode and the anode.

11. A cathode for a lithium secondary battery, the cathode comprising:
    the cathode material of claim 5; and
    a current collector,
    wherein the cathode material applied onto surfaces of the current collector.

12. A lithium secondary battery, comprising:
    a cathode comprising a current collector and the cathode material of claim 5 applied onto a surface of the current collector;
    an anode; and
    an electrolyte in contact with the cathode and the anode.

13. The cathode material of claim 4, wherein the Li-containing cathode active material is selected from the group consisting of LiCoO$_2$, LiNiO$_2$, Li(Co$_x$Ni$_{1-x}$)O$_2$ (0.5≤x<1), LiMn$_2$O$_4$, Li$_{1+x}$Mn$_{2-y-z-w}$Al$_y$Co$_z$Mg$_w$O$_4$ (0.03<x<0.25, 0.01<y<0.2, 0.01<z<0.2, 0≤w<0.1, and x+y+z+w<0.4), Li$_4$Mn$_5$O$_{12}$, or Li$_{1+x}$(Ni$_{1-y-z}$Co$_y$M$_z$)$_{1-x}$O$_2$ (0≤x≤0.2, 0.01≤y≤0.5, 0.01≤z≤0.5, 0<y+z<1, and M is Mn, Ti, Mg or Al).

14. A cathode material comprising particles, wherein one of the particles comprises:
    a core comprising Li-containing cathode active material; and a coating layer formed on surfaces of the core,
wherein the coating layer consists essentially of $Li_3PO_4$ and at least one Li-containing compound selected from the group consisting of $Li_2O$, $LiOH$, $Li_2CO_3$ and $Li_2C$,
wherein the coating layer has a thickness of 5 to 20 nm.

15. The cathode material of claim 14, wherein the Li-containing cathode active material is selected from the group consisting of $LiCoO_2$, $LiNiO_2$, $Li(Co_xNi_{1-x})O_2$ ($0.5 \leq x < 1$), $LiMn_2O_4$, $Li_{1+x}Mn_{2-y-z-w}Al_yCo_zMg_wO_4$ ($0.03 < x < 0.25$, $0.01 < y < 0.2$, $0.01 < z < 0.2$, $0 \leq w < 0.1$, and $x+y+z+w < 0.4$), $Li_4Mn_5O_{12}$, or $Li_{1+x}(Ni_{1-y-z}Co_yM_z)_{1-x}O_2$ ($0 \leq x \leq 0.2$, $0.01 \leq y \leq 0.5$, $0.01 \leq z \leq 0.5$, $0 < y+z < 1$, and M is Mn, Ti, Mg or Al).

16. The cathode material of claim 14, wherein the cathode active material is $Li[Ni_{0.6}Co_{0.2}Mn_{0.2}]O_2$.

17. A lithium secondary battery, comprising:
a cathode comprising the cathode material of claim 14 and a conductive material mixed with the cathode material;
an anode; and
an electrolyte in contact with the cathode and the anode.

* * * * *